(12) United States Patent
Brombach et al.

(10) Patent No.: US 8,502,495 B2
(45) Date of Patent: Aug. 6, 2013

(54) METHOD AND SYSTEM FOR MANAGING VEHICLE BATTERY CHARGE

(75) Inventors: Ronald Patrick Brombach, Plymouth, MI (US); Ryan Edwin Hanson, Livonia, MI (US); Anthony Dwayne Cooprider, Rochester Hills, MI (US); Conrad Smith, St. Joseph, MI (US); Daniel James Card, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 375 days.

(21) Appl. No.: 13/012,751

(22) Filed: Jan. 24, 2011

(65) Prior Publication Data

US 2012/0187915 A1    Jul. 26, 2012

(51) Int. Cl.
*H01M 10/44* (2006.01)
*H01M 10/46* (2006.01)

(52) U.S. Cl.
USPC ........................................... 320/104

(58) Field of Classification Search
USPC .......... 320/104, 107, 115, 128, 132; 324/426, 324/427, 430, 433
See application file for complete search history.

(56) References Cited

U.S. PATENT DOCUMENTS

| | | | |
|---|---|---|---|
| 4,146,825 A * | 3/1979 | Harhay | 320/141 |
| 4,493,001 A | 1/1985 | Sheldrake | |
| 5,138,246 A | 8/1992 | Kobayashi | |
| 5,159,257 A | 10/1992 | Oka | |
| 5,272,380 A | 12/1993 | Clokie | |
| 7,778,002 B2 * | 8/2010 | Skinner et al. | 361/111 |
| 2009/0243387 A1 | 10/2009 | Conen | |

* cited by examiner

*Primary Examiner* — Edward Tso
(74) *Attorney, Agent, or Firm* — Joseph E. Root

(57) ABSTRACT

A method and system for protecting a vehicle battery from excessive discharge are described. The method includes monitoring vehicle conditions including determining whether safety conditions are met and whether the vehicle is stationary. Further, the method activates a power save mode based on the monitoring step. The power save mode includes simulating an ignition off condition.

12 Claims, 3 Drawing Sheets

METHOD AND SYSTEM FOR MANAGING VEHICLE BATTERY CHARGE

BACKGROUND

The present application relates generally to automobile electrical systems, and more particularly to battery charge management in vehicles.

When a customer takes delivery of a new automobile, she has the reasonable expectation that the vehicle's battery is fully charged. Most particularly, a new user expects that the battery has not been fully discharged before the vehicle leaves the manufacturing facility. The normal vehicle manufacturing process, however, can produce exactly that result.

During manufacturing, a vehicle is switched from plant-supplied power to the vehicle's battery system after the battery is installed. Vehicle quality checks include repeatedly operating various electrical loads, opening and closing the doors, and turning the vehicle "on" via the ignition switch. Those activities drain the vehicle's newly installed battery. Often, vehicle ignition switches and doors are left open, further burdening the battery system. All of these conditions cause the vehicle to draw current from the battery. Thus the period between battery installation and delivery presents a very real risk that the battery could arrive at the customer completely discharged. Similar problems are encountered during long periods of vehicle storage or inactivity, such as storing a vehicle over the winter season.

At present, various controls exist in a vehicle's electrical architecture to limit battery drain during the normal operation For example, a feature referred to as "battery saver" is available that turns off a vehicle's lighting if the light is left on accidentally, a glove box is left open, or a door is left ajar. A simple timer solution is employed to extinguish the loads after a timeout. These solutions, while helpful during the manufacturing process, are not designed to aggressively manage and preserve the battery state of charge during the manufacturing process, but are rather designed for normal operation.

A need exists to implement systems and processes in vehicle architecture to monitor and minimize the amount of charge drawn from the vehicle battery between manufacture to delivery or during other low-operation periods.

SUMMARY

One embodiment of the present disclosure describes a method for protecting a vehicle battery from excessive discharge. The method includes monitoring vehicle conditions including determining whether safety conditions are met and the vehicle is stationary. Further, the method activates a power save mode based on the monitoring step. The power save mode includes simulating an ignition off condition.

Another embodiment of the present disclosure describes a system for protecting a vehicle battery from excessive discharge. A monitoring module monitors vehicle conditions including whether safety conditions are met and whether the vehicle is stationary. A control module activates a power save mode based on monitoring module outputs. The power save mode includes simulating an ignition off condition.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Description of Exemplary Embodiments

The present disclosure describes systems and methods for protecting a vehicle battery from excessive discharge. The claimed invention limits the amount of charge removed from the vehicle battery by simulating an ignition off condition, allowing the vehicle electrical system to enter a low-power operation mode. Based on knowledge of vehicle state, a determination can be made whether it is appropriate to override the ignition switch position information to manage battery life. A set of logical conditions may be examined to enter and exit the battery saving mode.

Figure 1:
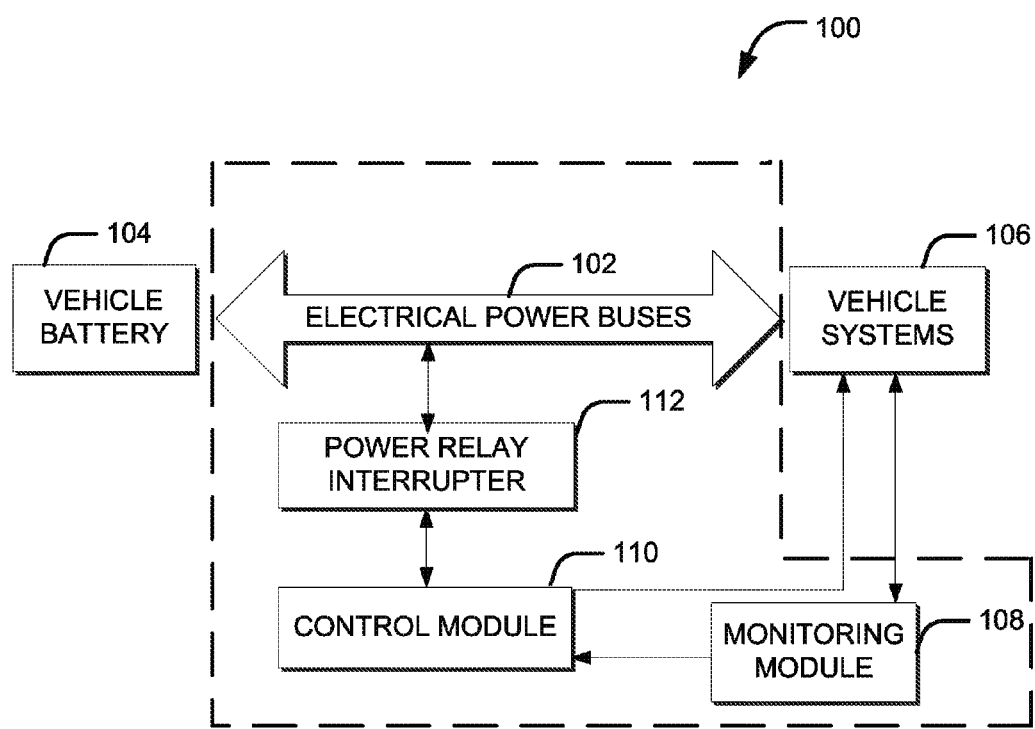
FIG. 1 shows an exemplary system for protecting a vehicle battery from excessive discharge.

FIG. 1 shows an exemplary system 100 for protecting a vehicle battery from excessive discharge. The system 100 shows electrical power buses 102 that connect the vehicle battery 104 to the appropriate vehicle systems 106, such as lighting, ignition, entertainment, and the like.

Other parts of the system 100 include a monitoring module 108, which is connected to the vehicle systems 106 and monitors certain vehicle conditions. In the present embodiment, the monitoring module 108 determines whether certain safety conditions are met and whether the vehicle is stationary. The monitoring module 108 may further monitor conditions such as whether an occupant is present in the vehicle, whether the vehicle is secure, etc.

A control module 110 is connected to the electrical power buses 102 such that it can manipulate the state of the vehicle ignition regardless of the actual position of the key. This manipulation involves the control module 110 communicating with the vehicle systems 106 over the electrical power buses 102 or independently. The control module 110 receives signals from the monitoring module 108, and based on these signals, can activate a power save mode, which involves simulating an ignition off condition, thereby preserving the battery state of charge. The simulation may involve disconnecting the vehicle battery 104 from the vehicle systems 106 through signaling over the electrical power buses 102.

In one implementation, the control module 110 takes advantage of the electrical power buses 102 being software controlled through electronically controlled relays. FIG. 1 shows a power relay interrupter 112 positioned between the control module 110 and the electrical power buses 102. The control modules 110 activates and controls the power relay interrupter 112, which can interrupt the electrical power buses 102 for managing the power save mode.

The control module 110 can prevent activation of the power save mode based on the safety conditions. Safety conditions can include the engine being off or the vehicle being occupied. In case either condition is violated, the control module 110 prevents activation of the power save mode. For example, the control module 110 prevents activation of the power save mode when the engine is running, as the activation might be unsafe at this time. Another example of a vehicle condition monitored by the monitoring module 108, as already mentioned, is whether an occupant is present in the vehicle, and this may be performed using occupant sensors connected to the monitoring module 108. Alternatively, the monitoring module 108 may establish an occupant's presence by sensing certain vehicle conditions such as simply monitoring whether the brake is activated. In case an occupant is present in the vehicle, the control module 110 may not activate the power save mode as it may not be required. Another condition that may be monitored by the monitoring module 108 is the position of the ignition switch. If the ignition has been in the same position for longer than a predetermined period of time, recorded on a timer, this may indicate that the vehicle has been left unattended and no occupant is present. Based on these conditions, the control module 110 may activate or prevent the activation of the power save mode.

An occupant may manually supply a power save mode activate signal by the push of a button, selection from a display screen, or through any other similar software or hardware trigger. It will be readily understood by those in the art that several different conditions and sensors may be employed to determine whether to place the vehicle in the power save mode without departing from the purpose and scope of the claimed invention.

The control module 110 includes a deactivation module (not shown) that may trigger the deactivation of the power save mode. An occupant can manually supply a power save mode deactivate signal to the control module 110 in a manner similar to providing the activate signal, as discussed above. The deactivation module may send a deactivation signal directly to the vehicle systems 106 or over the electrical power buses 102 to the vehicle systems 106. Starting the engine, inserting a key in the ignition, changing the ignition position, activating the brake, a signal from an occupant sensor in the vehicle are few examples of conditions, which when sensed by the monitoring module 108, may trigger the deactivation of the power save mode. The timer, which in some embodiments contributes to the activation of the power save mode, may be reset when any of the above conditions are sensed, such as change in ignition position or activation of the brake.

Figure 2:
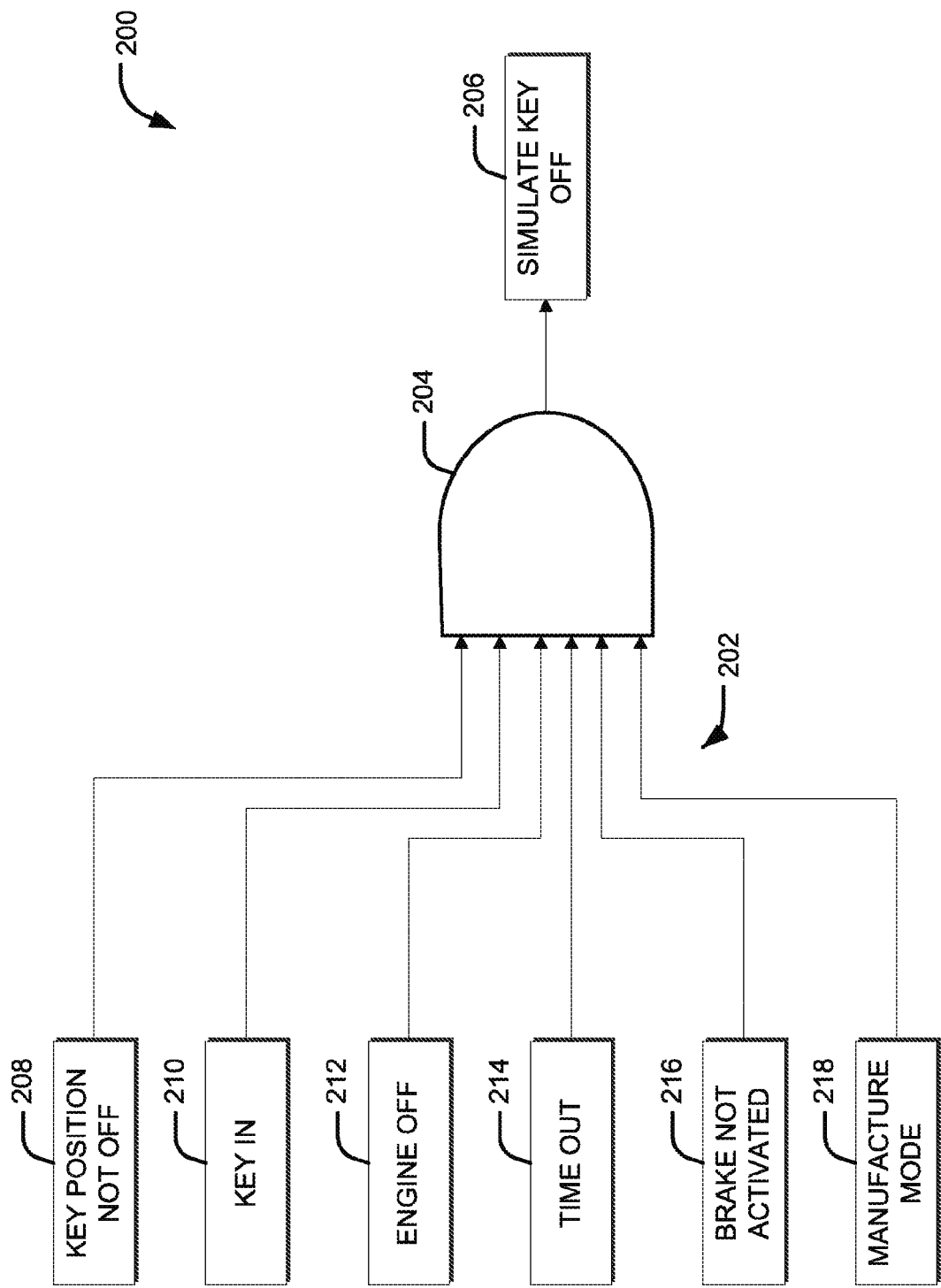
FIG. 2 depicts an exemplary method, implemented in connection with the system of FIG. 1, for protecting a vehicle battery from excessive discharge.

FIG. 2 illustrates an exemplary embodiment of a control module 200 for protecting a vehicle battery from excessive discharge. The control module 200 accepts several signals 202 as input to an AND gate 204 for determining whether to implement a power save mode within the vehicle. The power save mode simulates an ignition off position 206 in the vehicle, irrespective of the actual position of the ignition switch, if it is determined that the signals 202 all have a 'true' value.

The signals 202 include a signal indicating that the ignition is not in the off position 208 and another signal indicating that the key is inserted in the ignition switch 210. Other signals 202 indicate that the engine is off 212, and a timeout 214 has occurred in the timer, as discussed in relation with FIGS. 1 and 2. In addition, the brake should not be activated 216. A "manufacture mode" 218 signal indicates that the vehicle is in a quick sleep mode, which is a predefined condition that exists in the art. Once these conditions are established, a timer is started and based on the predefined timeout 214, the vehicle systems drop to a low quiescent current consumed by the vehicle systems while in a non-operative or quick sleep state. The power save mode of the claimed invention however, takes into account other conditions (as described in relation with FIGS. 1 and 2) in addition to the ones considered during the "manufacture mode" implementation. The signals or conditions considered while implementing power save mode, according to the embodiments of the present disclosure, may vary without departing from the purpose and scope of the present disclosure.

If all the signals 202 are 'true', the AND gate 204 triggers simulation of the ignition off position 206 and extinguishes vehicle loads such as the radio, exterior lights, HVAC, powertrain, etc. The present embodiment takes advantage of the vehicle architectural design and utilizes the "manufacture mode" to aggressively extinguish loads by emulating, with proper control logic, the function of the ignition switch, thereby preserving the battery state of charge.

Figure 3:
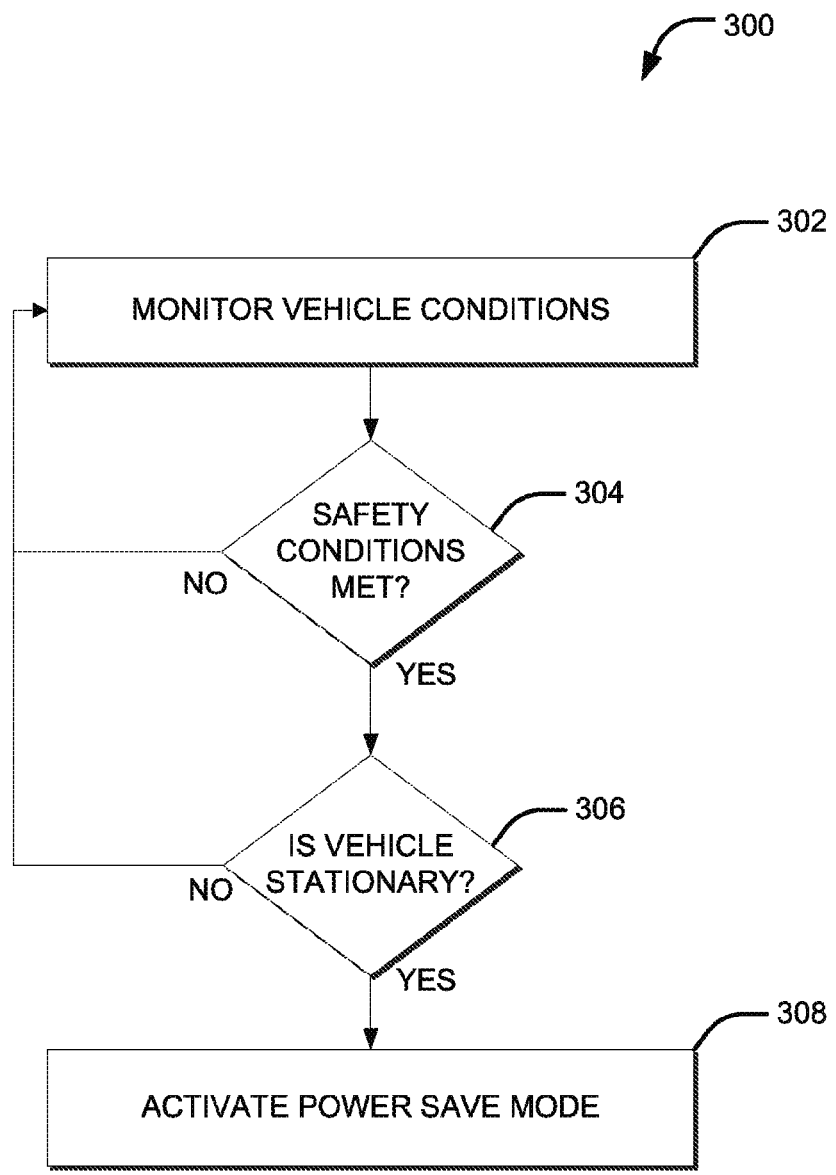
FIG. 3 illustrates an exemplary embodiment of a control module for protecting a vehicle battery from excessive discharge.

FIG. 3 depicts an exemplary method 300, implemented in connection with the system 100, for protecting the vehicle battery 104 from excessive discharge. At step 302, the method 300 monitors vehicle conditions including determining whether the safety conditions have been met, at step 304. The safety conditions can include zero engine revolutions per minute, an inactivated break, zero vehicle speed, etc. These vehicle conditions have already been discussed in detail in relation with FIG. 1.

If the safety conditions have not been met, the method 300 returns to step 302. If however, the safety conditions have been met, the method 300 proceeds to step 306, where it is determined whether the vehicle is stationary. If the vehicle is stationary, the method 300 activates a power save mode at step 308, where the power save mode involves simulating an ignition off condition. If however, the vehicle is not stationary, the method 300 returns to step 302.

As explained in relation with FIG. 1, an occupant may manually supply a power save mode activate signal. It will be readily understood by those in the art that several different conditions and sensors may be employed to determine whether to place the vehicle in the power save mode without departing from the purpose and scope of the claimed invention. Deactivation of the power save mode also occurs as discussed in relation with FIG. 1.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

What is claimed is:

1. A method for protecting a vehicle battery from excessive discharge, the method comprising:
   monitoring vehicle conditions including determining whether:
   safety conditions are met; and
   the vehicle is stationary; and
   activating a power save mode based on the monitoring step, wherein the power save mode includes simulating an ignition off condition.

2. The method of claim 1 further comprising exiting the power save mode on performing one or more of the following steps:
   supplying a power save mode deactivate signal;
   starting the engine;
   inserting a key;
   activating the brake; or
   changing of the ignition position.

3. The method of claim 1, wherein the monitoring step further monitors whether one or more of the following conditions are met:
- the brake is activated;
- an occupant is present in the vehicle;
- the engine is running; or
- the ignition switch has been in a specified position for longer than a predetermined period of time recorded on a timer.

4. The method of claim 3, wherein the timer is reset upon a determination that one or more of the following conditions is true:
- the ignition position is changed; or
- the brake is activated.

5. The method of claim 1 further comprising activating the power save mode on receiving a power save mode activation signal.

6. The method of claim 1, wherein the safety conditions include:
- zero vehicle speed;
- zero engine revolutions per minute; or
- the brake being inactivated.

7. A system for protecting a vehicle battery from excessive discharge, the system comprising:
- a monitoring module configured to monitor whether vehicle conditions are met, the conditions including:
  - safety conditions; and
  - the vehicle being stationary; and
- a control module configured to activate a power save mode based on monitoring module outputs, wherein the power save mode includes simulating an ignition off condition.

8. The system of claim 7 further comprising a deactivation module configured to allow exiting the power save mode upon a determination that one or more of the following conditions are true:
- reception of a power save mode deactivate signal;
- start of engine;
- key insertion;
- brake activation; or
- change in ignition position.

9. The system of claim 7, wherein the monitoring module further monitors whether one or more of the following conditions:
- the brake is activated;
- an occupant is present in the vehicle;
- the engine is running; or
- the ignition switch has been in a specified position for longer than a predetermined period of time recorded on a timer.

10. The system of claim 9, wherein the timer is reset upon a determination that one or more of the following conditions is true:
- the ignition position is changed; or
- the brake is activated.

11. The system of claim 7, wherein the control module activates the power save mode on receiving a power save mode activation signal.

12. The system of claim 7, wherein the safety conditions include:
- zero vehicle speed;
- zero engine revolutions per minute; or
- the brake being inactivated.

* * * * *